(12) United States Patent
Beard et al.

(10) Patent No.: US 9,489,937 B1
(45) Date of Patent: Nov. 8, 2016

(54) REAL-TIME NOISE REDUCTION SYSTEM FOR DYNAMIC MOTOR FREQUENCIES ABOARD AN UNMANNED AERIAL VEHICLE (UAV)

(71) Applicant: Trace Live Network Inc., Calgary (CA)

(72) Inventors: Paul Beard, Bigfork, MT (US); Cameron Chell, Calgary (CA); Jamie Clarke, Calgary (CA); Craig McDermott, Cedar Rapids, IA (US); Erika Racicot, Calgary (CA); Paul Readwin, Calgary (CA)

(73) Assignee: Trace Live Network Inc., Calgary (CA)

( * ) Notice: Subject to any disclaimer, the term of this patent is extended or adjusted under 35 U.S.C. 154(b) by 35 days.

(21) Appl. No.: 14/642,496

(22) Filed: Mar. 9, 2015

Related U.S. Application Data

(60) Provisional application No. 61/949,809, filed on Mar. 7, 2014.

(51) Int. Cl.
*G10K 11/16* (2006.01)
*G10K 11/178* (2006.01)

(52) U.S. Cl.
CPC ... *G10K 11/1782* (2013.01); *G10K 2210/1281* (2013.01); *G10K 2210/3011* (2013.01)

(58) Field of Classification Search
CPC .... H04N 5/23293; H04N 5/33; H04N 5/332; H04N 5/335; H04N 5/3415; H04N 7/142; H04N 7/157; H04N 7/183; H04J 1/16; H04J 3/14; H04M 11/04; H04M 1/05; H04M 1/6066; H04M 1/72522; H04M 2242/04; H04M 2250/02; H04M 2250/04; H04M 3/5116; H04R 2420/07; H04R 5/033; H04R 5/04; G05D 1/0088; G05D 1/101; G05D 1/0011; G05D 1/0038; G05D 1/0094; G05D 1/0016; G05D 1/0022; G05D 1/00; G05D 1/0027; G05D 1/021; G05D 1/12; G05D 13/00; G05D 1/0044; G05D 1/0219; G05D 1/0251; G05D 1/0297
USPC ........ 381/92, 1, 86, 71.1–71.7, 71.11–71.14, 381/94.1–94.7, 26; 181/247; 701/2, 3; 244/56, 17.23
See application file for complete search history.

(56) References Cited

U.S. PATENT DOCUMENTS

| | | | | |
|---|---|---|---|---|
| 5,754,662 | A * | 5/1998 | Jolly | G10K 11/1786 381/71.11 |
| 8,116,482 | B2 * | 2/2012 | Cerwin | H04R 1/086 181/206 |
| 9,199,733 | B2 * | 12/2015 | Keennon | B64C 27/12 244/17.11 |
| 2004/0066940 | A1 * | 4/2004 | Amir | G10K 11/1784 381/94.2 |
| 2005/0271221 | A1 * | 12/2005 | Cerwin | H04R 1/406 381/92 |
| 2006/0034463 | A1 * | 2/2006 | Tillotson | G08G 5/0095 381/1 |

* cited by examiner

*Primary Examiner* — Lun-See Lao
(74) *Attorney, Agent, or Firm* — Suiter Swantz pc llo

(57) ABSTRACT

Systems and methods for simultaneously capturing live audio and video feeds and reducing motor/rotor noise associated with the video feed for a multirotor unmanned aerial vehicle (UAV). Noise reduction occurs in real time or near real time as one or more frequencies associated with a motor, rotor, or attitude of the UAV are recognized, subtracted and/or dithered from the audio feed, resulting in one or more correction signals. The one or more correction signals may be dynamically summed in order to generate a corrected audio feed for transmission.

22 Claims, 5 Drawing Sheets

REAL-TIME NOISE REDUCTION SYSTEM FOR DYNAMIC MOTOR FREQUENCIES ABOARD AN UNMANNED AERIAL VEHICLE (UAV)

CROSS-REFERENCE TO RELATED APPLICATIONS

This application claims priority under 35 U.S.C. §119(e) to provisional patent application U.S. Ser. No. 61/949,809 filed on Mar. 7, 2014. Said application is herein incorporated by reference in its entirety.

TECHNICAL FIELD

Embodiments of the present invention relate generally to unmanned aerial vehicles and more particularly to systems and methods for removing noise from a live audio stream captured onboard the unmanned aerial vehicle.

SUMMARY

It is to be understood that both the foregoing general description and the following detailed description are only for illustrative and explanatory purposes, and are not necessarily restrictive of the invention as claimed. The accompanying drawings, which are incorporated in and constitute a part of the specification, illustrate embodiments of the invention and together with the general description, serve to explain the principles of the invention.

A system for real-time noise reduction aboard an unmanned aerial vehicle (UAV) having one or more rotors and one or more motors coupled to the one or more rotors is disclosed. In one embodiment, the system includes one or more microphones fixed to the UAV and configured to capture a first audio signal. In one embodiment, the system includes one or more sensors fixed to the UAV and configured to determine one or more rotor speeds, one or more motor speeds, and an attitude of the UAV. In one embodiment, one or more digital signal processors are fixed to the UAV and configured to: determine one or more frequencies corresponding to the one or more rotors, the one or more motors, and/or the attitude of the UAV; generate one or more correction signals corresponding to a dynamic sum of the one or more frequencies; and generate a second audio signal by combining the one or more correction signals and the first audio signal.

An unmanned aerial vehicle (UAV) configured to capture a streaming audio feed is additionally disclosed. In one embodiment, the UAV includes an airframe. In one embodiment, the UAV includes one or more rotors fixed to the airframe, configured to rotate at a rotor speed selected from a plurality of rotor speeds. In one embodiment, the UAV includes one or more motors coupled to the one or more rotors, configured to drive the one or more rotors and to operate at a motor speed selected from a plurality of motor speeds. In one embodiment, one or more microphones are fixed to the airframe and configured to capture one or more audio signals. In one embodiment, the UAV includes one or more sensors fixed to the airframe and configured to determine at least one of a rotor speed, a motor speed, and an attitude of the UAV. In one embodiment, the UAV includes one or more digital signal processors coupled to the one or more microphones and to the one or more sensors, the one or more digital signal processors configured to: generate a digital representation of the one or more audio signals; determine one or more frequencies corresponding to at least one of the rotor speed, the motor speed, and the attitude of the UAV; generate one or more correction signals corresponding to a dynamic sum of the first frequency; and generate a corrected audio signal by combining the one or more captured audio signals and the one or more correction signals.

A method for real-time noise reduction aboard an UAV having (1) at least one rotor and (2) at least one motor coupled to the at least one rotor is additionally disclosed. In one embodiment, the method includes capturing a first audio signal via one or more microphones fixed to the UAV. In one embodiment, the method includes determining one or more frequencies corresponding to a rotor, a motor, and/or an attitude of the UAV. In one embodiment, the method includes generating one or more correction signals corresponding to a dynamic sum of the one or more frequencies. In one embodiment, the method includes generating a second audio signal by combining the one or more correction signals and the first audio signal.

BRIEF DESCRIPTION OF THE FIGURES

Embodiments of the presently disclosed invention may be better understood by those skilled in the art by reference to the accompanying figures in which.

DETAILED DESCRIPTION

Features of the invention in its various embodiments are exemplified by the following descriptions with reference to the accompanying drawings, which describe the invention with further detail. These drawings depict only selected embodiments of the invention, and should not be considered to limit its scope in any way.

The unmanned aerial vehicles (UAVs) contemplated herein comprise an airframe and rotor configuration that may include components or devices configured to capture both live audio and live visual streaming. As is the case with most vehicles, audio disturbances (e.g., operating noises) are inherent byproducts of the motorized activity of the UAVs. As audio and visual streaming devices onboard a UAV (e.g., onboard camera and microphones) are configured to capture images and accompanying audio for streaming in real time or near real time, it is desirable to reduce or eliminate operating noise from the audio stream immediately rather than during post processing. Thus, the UAVs of this disclosure generally include one or more real-time noise-reducing devices. These devices may reduce or eliminate the noise generated by acquiring and further manipulating (e.g., subtracting, canceling, and/or averaging out) one or more audio signal frequencies, amplitudes, and/or harmonics corresponding to operating noise. After the frequencies, amplitudes, and/or harmonics are acquired and further manipulated, a corrected audio signal (i.e., free of noise) is generated and transmitted.

Figure 1A:
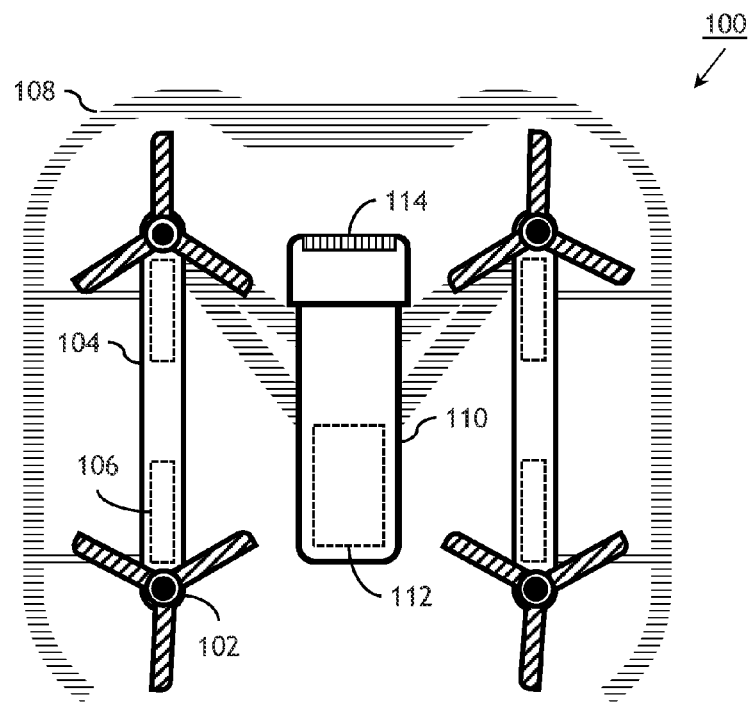
FIG. 1A-1B illustrate respective top and side views of an unmanned aerial vehicle (UAV), according to embodiments of this disclosure.
Figure 1B:
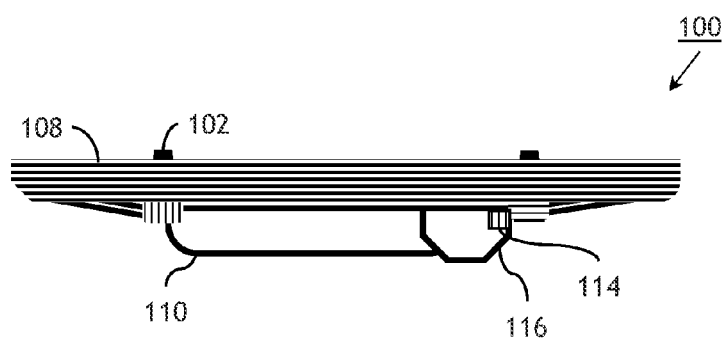
Figure 2A:
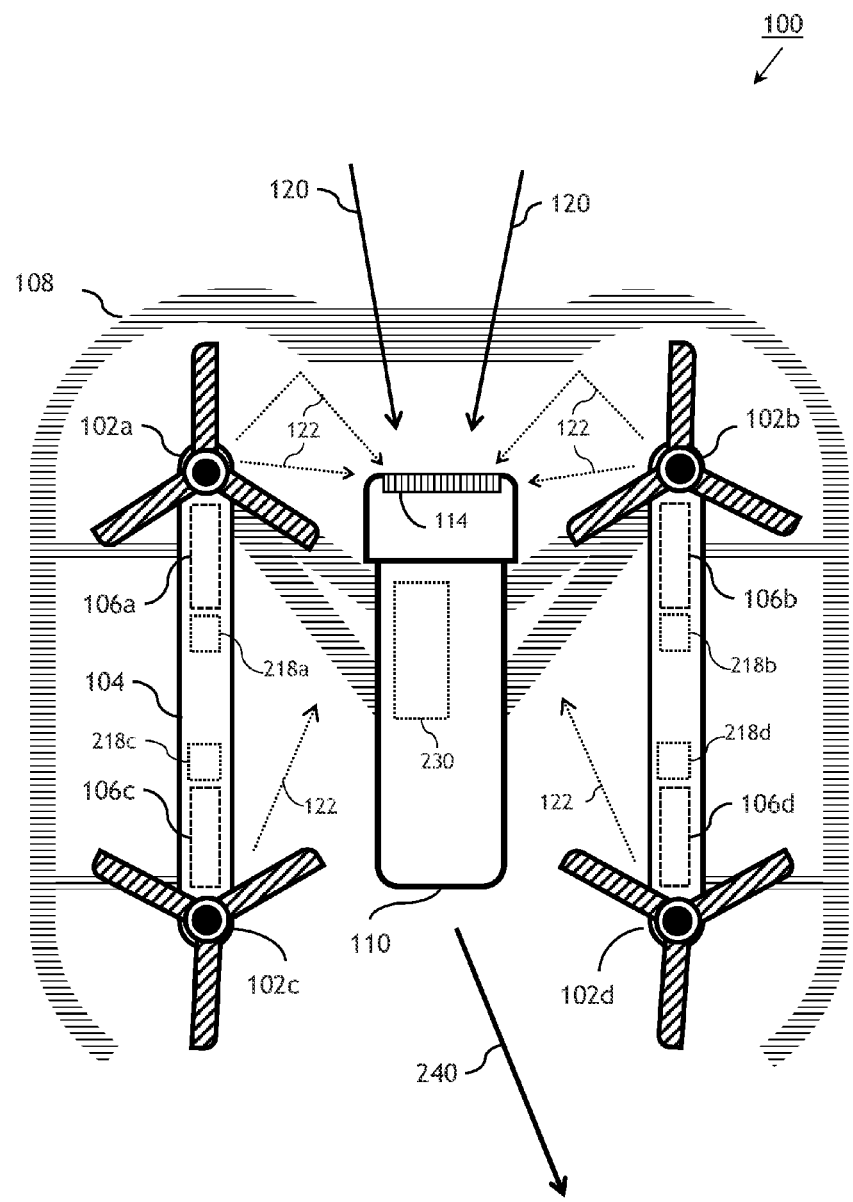
FIG. 2A-2B illustrate a UAV having a noise reducing system with one or more mics and one or more cameras, according to embodiments of this disclosure.

Referring generally to FIGS. 1A and 1B, an unmanned aerial vehicle (UAV) 100 comprises an airframe 108, one or more rotors 102, one or more support/housing structures 104, one or more motors (e.g., electronic speed controls) 106, a center console (e.g., housing for the main circuit board) 110, and a power source (e.g., battery) 112 fixed to the airframe 108. In one embodiment, the UAV includes a microphone 114 fixed to the airframe 108 and configured to capture a streaming audio feed. For example, the streaming audio feed may include one or more audio signals 120. Referring also to FIG. 2A, the microphone 114 may include a first microphone and a second microphone, each configured to capture an audio signal 120. In one embodiment, the microphone 114 includes a beamforming microphone array.

In one embodiment, the one or more rotors 102 rotate at variable rotor speeds, one or more of which may be selected for a desired operating speed, operating height, operating velocity, operating orientation, or operating direction. In one embodiment, the UAV 100 has more than one rotor 102. In one embodiment, the number of rotors operably coupled to the UAV is not limiting. For example, the UAV may be a tri-copter, quadcopter, hexacopter, octocopter, or any other configuration of multi-rotor UAV. In one embodiment, the UAV further comprises one or more motors 106 coupled to the rotors 102. For example, one or more motors may be configured to drive the rotors 102 and to operate at one or more predetermined operating speeds selected from a plurality of motor speeds via one or more power controls.

In one embodiment, referring to FIG. 1B, the UAV further comprises one or more cameras 116 fixed to the airframe 108. In one embodiment, the camera 116 is configured to capture one or more images. In one embodiment, the images captured correspond to the one or more audio signals 120 of the streaming audio feed. For example, the UAV may stream captured video images and the accompanying audio signal in real time or near real time to nearby mobile devices, or via a restricted access channel available to selected users.

Applicant notes that for purposes of simplicity the camera 116 and microphone 114 have been depicted in a simplified diagram. This depiction, including the components and geometrical configuration, is not limiting and is provided for illustrative purposes only. It is recognized herein that the camera 116 and microphone 114 may include any number of elements, (e.g., optics, aperture, mount, etc.) to carry out the image and audio capturing processes contemplated in this disclosure.

Figure 2B:
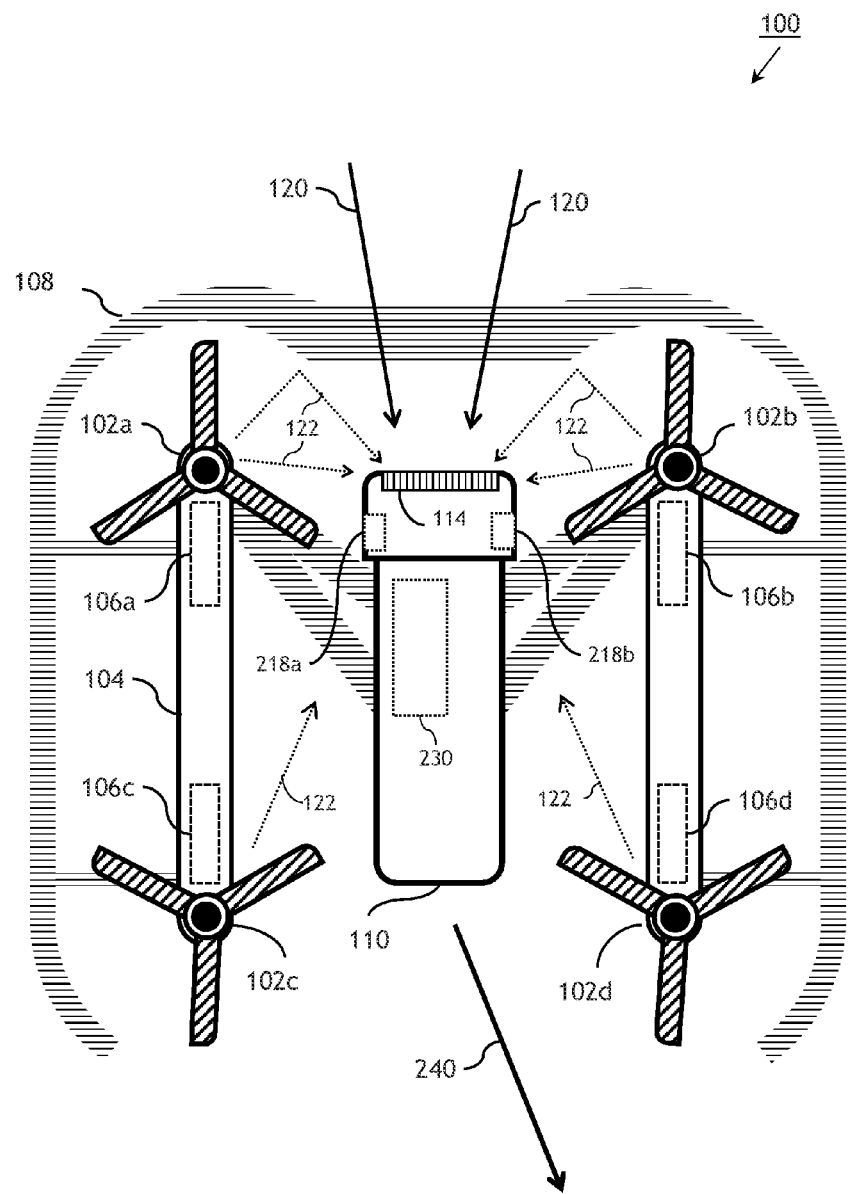

Referring generally to FIGS. 2A and 2B, an unmanned aerial vehicle (UAV) 100 comprises a noise-reduction system 200. In one embodiment, the UAV 100 further comprises four rotors 102a-102d (i.e., the UAV 100 is a quadcopter). In one embodiment, the UAV 100 further comprises four motors 106 corresponding to the four rotors 102a-102d (e.g., electronic speed controls 106a-106d).

Figure 3:
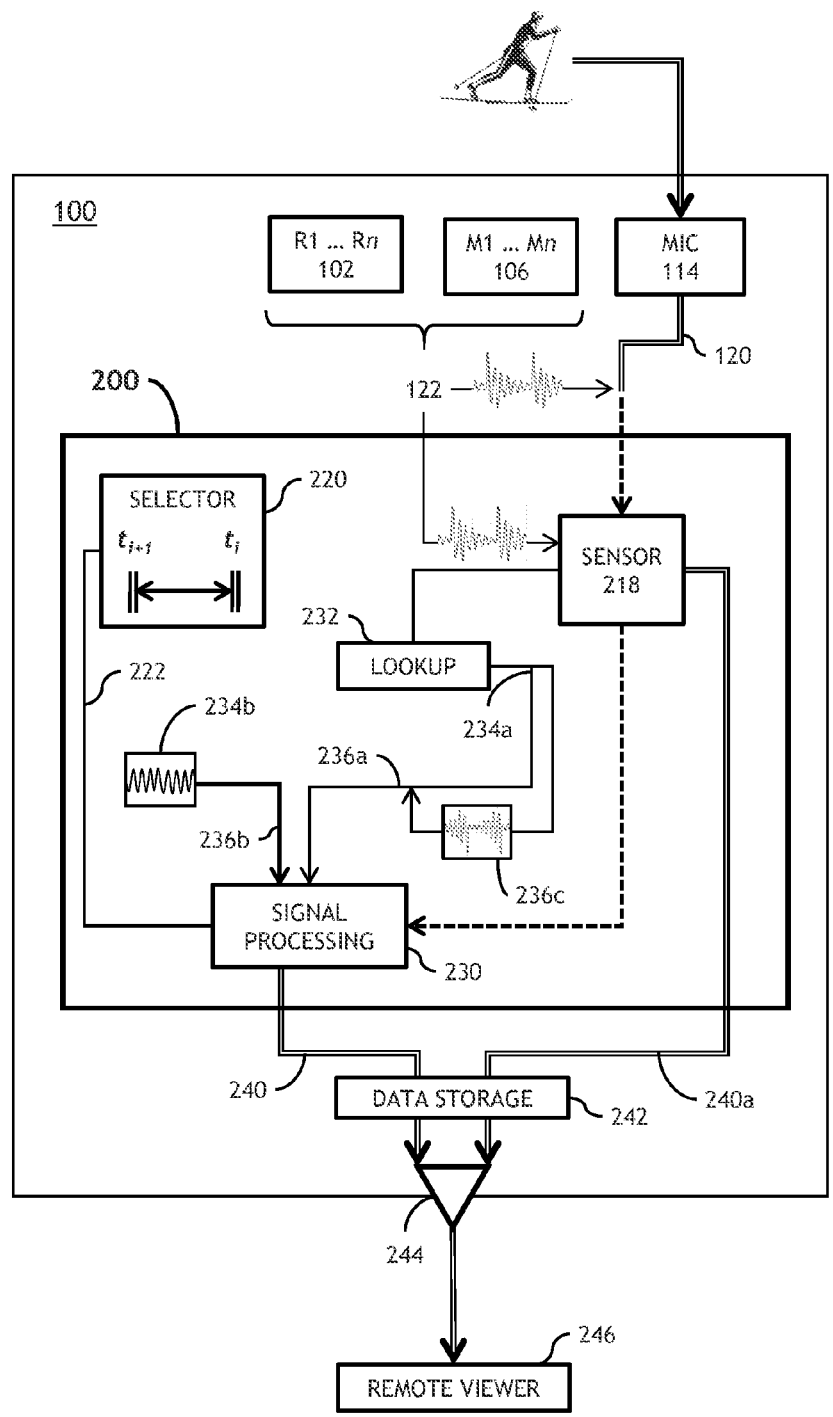
FIG. 3 illustrates a schematic diagram of a noise reducing system, according to embodiments of this disclosure.

In one embodiment, referring also to FIG. 3, the UAV 100 and noise-reducing system 200 further comprises one or more sensors 218 fixed to the airframe 108 and configured to measure/detect one or more variables (e.g., audio signals, a rotor speed, motor speed, motor power input, etc.). In one embodiment, the sensors 218 are configured to track the attitude of the UAV 100, as well as the rotational velocity of each motor 102 or rotor 106. For example, each rotor 102 may include multiple blades. During operation, each motor 106 and each blade of each of rotor 102 produces a dynamic noise on a set frequency spectrum (e.g., audio signal 122). Dependent on at least a determined speed and a determined orientation or angle of the UAV 100 (e.g., determined by sensors 218), the noise created from each rotor 102 and/or motor 106 varies on a constant basis. For example, a rotor 102 or motor 106 may spin at a determined rate (e.g., revolve at x RPM), while the UAV may have a determined attitude (e.g. orientation) y. The combination of x and y yields a determined noise z (e.g., the audio feed will include operating noise 122 having frequency/frequencies z). Because operating noise frequencies z vary consistently according to x and y), identifying and removing operating noise 112 from the desired frequency spectrum 240 can be derived from a knowledge of x and y at any given instant or for a particular time window. Applicant notes that additional variables may contribute to the creation of operating noise 112 (e.g., air thickness, wind speed, or weather conditions such as snow or rain.

In one embodiment, the UAV 100 and noise-reducing system 200 further comprise one or more digital signal processors 230 communicatively coupled to the one or more microphones 114 and to sensors 218. In one embodiment, the digital signal processors 230 are configured to generate a digital representation of an incoming audio signal 120. In one embodiment, digital signal processors 230 are configured to determine one or more frequencies 122 corresponding to at least one of the rotor speed, the motor speed, and the attitude of the UAV 100. In one embodiment, digital signal processors 230 are configured to generate one or more correction signals 236 corresponding to a dynamic sum of the one or more noise frequencies 122. In one embodiment, digital signal processors 230 are configured to generate one or more additional audio signals by combining the first audio signal 120 and the one or more correction signals 236. In one embodiment, the one or more additional audio signals includes a corrected audio signal 240 for outbound streaming (e.g., via wireless link 244).

In one embodiment, predetermined frequency ranges 234a associated with the velocity of each motor or rotor 102, as well as attitude-dependent frequency ranges, may be stored in lookup tables 232 and accessed by the digital signal processor 230 at predetermined intervals. In one embodiment, these accessed frequencies 234a may be inverted or otherwise processed to cancel out operating noise frequencies 122 or their components from the main audio feed (e.g., incoming audio signal 120) for each interval.

In one embodiment, referring to FIG. 2B, the sensors 218 further comprise one or more additional microphones. For example, the sensors 218 of UAV 100 may include, but are not limited to, microphones 218a and 218b, which are associated with (e.g., positioned proximal to) rotors 102 (including rotors $R_1, \ldots R_n$; $R_1$ through $R_4$ for an embodiment of UAV 100 that is a quadcopter) and motors 106 ($M_1, \ldots M_n$). In one embodiment, sensing microphones 218a, 218b are focused or positioned to capture one or more undesired audio feeds or signals 122 associated with motors 106 or rotors 102. In one embodiment, sensing microphones 218 work in tandem with microphone array 114. For example, microphone array 114 may be configured to follow the path of the video signals captured by camera 116. In this regard, microphone array 114 may be configured to capture one or more desired audio feeds (e.g., audio signal 120), while sensing microphones 218a, 218b capture one or more undesired audio feeds (e.g., audio signal 122). In one embodiment, sensors 218 include a combination of sensors and sensing microphones working in concert to identify and eliminate operating noise 122. For example, microphone array 114 may also capture portions of the undesired audio feed 122.

In one embodiment, sensors 218 are adapted to detect one or more operating noise frequencies 122 associated with one or more selected time windows or time bands (e.g., a window extending from time $t_i$ to time $t_{i+i}$) where window/band size is determined by selector 220. For example, one or more clock generators 222 may be configured to establish the one or more time windows or time bands. In one embodiment, the sensor 218 (e.g., microphones 218a and 218b) is configured to capture one or more audio feeds (e.g., audio signals 120, 122) and partition portions of the one or more audio feeds 120, 122 according to the selected time bands. In one embodiment, the selector 220 may allow a user to shorten or lengthen the time windows in which the one or more audio feeds are obtained.

In one embodiment, the digital signal processor 230 is further configured to recognize the partitions, time windows, or time bands (or a series of partitions thereof, corresponding to a continuous audio feed) during which the audio signals (e.g., 120 and 122) are captured. In one embodiment, the digital signal processor 230 is further configured to use a clock generator 222 to generate the time windows/time bands, or series of time windows/time bands, during which the audio signals 120, 122 are captured.

In one embodiment, the sensor 218 is operably connected to a lookup table 232 and a digital signal processor 230 to receive, recognize and/or calculate, and immediately subtract one or more noise-associated frequencies 122 from one or more incoming audio signals 120. For example, audio detection algorithms programmed to work with sensor 218, or microphone array 114, may cause the sensor 218 or the microphone array 114 to capture only audio signals 120, 122 within selected frequency ranges or outside selected frequency ranges. For instance, a selected frequency range may be a range determined during a calibration step to correspond with a motor 106, a rotor 102, or one or more combinations of the two at a given attitude of the UAV 100.

In one embodiment, the sensor 218 may look up or find one or more frequencies 234a in the lookup table 232 that previously were determined to be associated with noise 122 generated by the motors $M_1$ through $M_n$ (106) and/or the rotors $R_1$ through $R_n$ (102) at one or more attitudes of the UAV 100. The sensor 218 is further configured to determine the current attitude of the UAV 100 and subtract any frequency of the captured incoming audio signals (e.g., signal 120 and/or signal 122) that corresponds to the frequency found in the lookup table 232 (e.g., frequency 234a) at the current attitude of the UAV. In this regard, by immediately subtracting undesired frequencies 122, one or more corrected audio signals 240 may be generated in real time or near real time.

In one embodiment, the digital signal processor 230 and sensor 218 are configured to receive and recognize/calculate one or more frequencies 234a associated with an undesired audio signal 122 and utilize noise-cancellation techniques to produce a corrected audio signal 240. For example, the digital signal processor 230 and sensor 218 may be configured to receive and recognize/calculate one or more frequencies associated with the noise in audio signal 122 and generate a correction signal 236 in the form of an anti-noise or anti-wave to reduce and/or eliminate the undesired audio signal 122. For instance, the sensor 218 and/or digital signal processor 230 may include a mixer which processes the one or more captured audio signals (e.g., audio signal 122). In this regard, the output from the mixer may be a wave, the harmonics of which are analyzed to determine one or more characteristics of the wave, including, but not limited to, one or more amplitudes. In one embodiment, the sensor 218 and/or digital signal processor 230 are further configured to duplicate the wave, and then create an anti-wave 236c by inverting the phase of the duplicate wave. For example, the sensor 218 and/or digital signal processor 230 may be configured to match one or more amplitudes of an inverted duplicate wave to one or more amplitudes of the one or more captured audio signals (e.g., audio signal 122). The digital signal processor 230 and/or sensor 218 may be further configured to combine the inverted duplicate wave 236c with the one or more captured audio signals 120, 122 to result in one or more corrected audio signals (e.g., corrected audio signal 240).

In one embodiment, the sensor 218 and digital signal processor 230 are further configured to dither, or randomly average out, the recognized undesired frequencies (e.g., frequency 234a) of the motors 106 and/or rotors 102 (e.g., $M_1$ through $M_n$ and $R_1$ through $R_n$) at a determined attitude during each of a series of time windows. This process may result in one or more averaged frequencies 234b that can be added to one or more desired audio frequencies to yield one or more corrected frequencies 236. These corrected frequencies 236 may be further processed (and combined with inbound audio signals 120, 122) by digital signal processor 230 to yield one or more corrected audio signals 240.

In one embodiment, a frequency subtraction process and/or noise cancellation process together with a signal dithering process is utilized. For example, the combined process may wish to eliminate a broader range of frequencies 122 than the subtraction or cancellation process alone would initially capture. Thus, a combination process would initially capture a broader range of frequencies 122 for noise cancellation (via digital signal processors 230) and utilize the dithering process described above for additional noise-reduction purposes. Each combination of the noise reduction/cancellation techniques discussed above is included in embodiments of this disclosure. For example, noise cancellation combined with frequency subtraction is included. By way of another example, noise cancellation together with dithering is also included. By way of another example, noise subtraction together with dithering is also included.

In one embodiment, the UAVs 100 comprise one or more transmitters 244 configured to transmit the real-time or near real-time audio and video streaming (e.g., second audio signal 240 and corresponding captured video images) via a wireless link (e.g., Wi-Fi).

In one embodiment, the UAV 100 further comprise one or more data storage units 242 configured to store the one or more audio signals 120, 122 and one or more additional audio signals (e.g., the second audio signal 240). For example, mountains or other intervening obstacles may hinder wireless transmission. In such cases, one or more corrected audio signals 240 are stored in 242 along with video signals, to be transmitted via wireless transmitter and link 244 at a later time (e.g., when wireless transmission is no longer obstructed).

The embodiments of UAV 100 (e.g., illustrated in FIGS. 1A-3) may be further configured as described herein. In addition, UAV 100 may be configured to perform any other step(s) of any of the method embodiment(s) described herein. The following method embodiments relate to selected frequency reduction and noise reduction in an audio capture system of an UAV. It is generally recognized that UAV 100 is suitable for implementing noise and selected frequency reduction steps of the following embodiments. It is noted, however, the methods described below are not limited to the architectures of 100.

Figure 4:
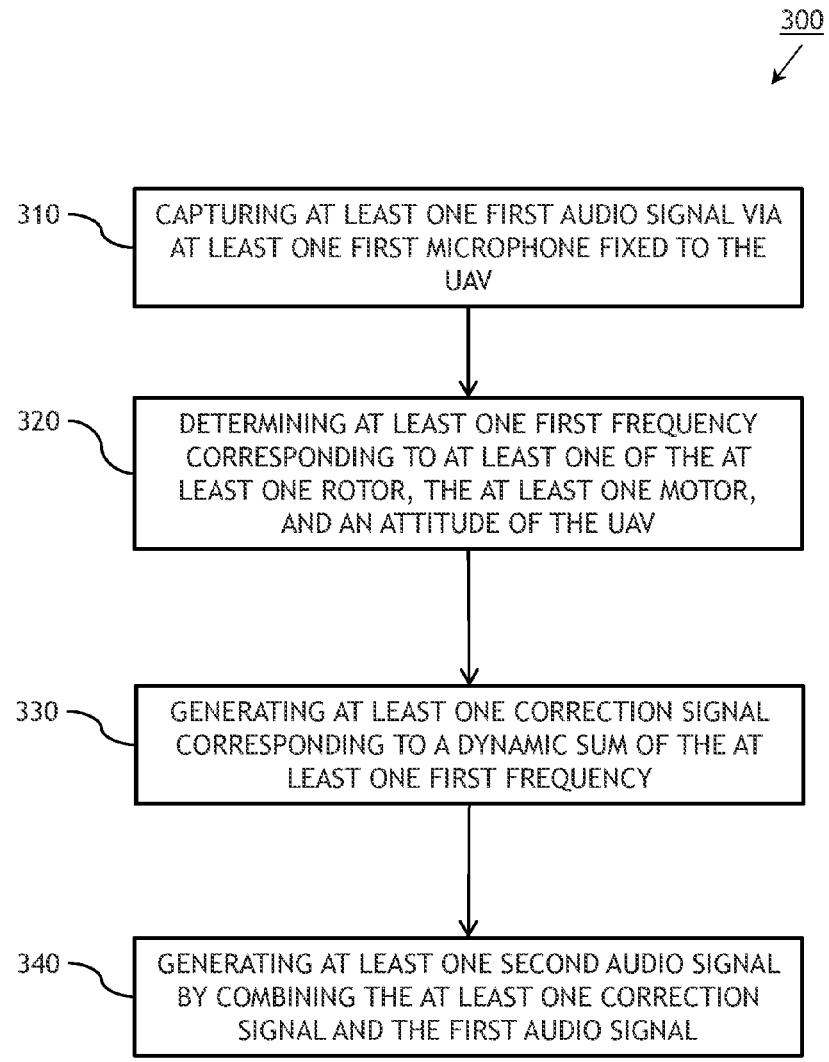
FIG. 4 is a process flow diagram of a method of operation for a noise reducing system, according to embodiments of this disclosure.

FIG. 4 illustrates a flow diagram depicting a noise and selected frequency reduction process 300 for UAVs and/or systems of UAVs, in accordance with one or more embodiments of the present disclosure.

In step 310, UAV 100 captures one or more audio signals 120 using one or more microphones (e.g., the beamforming microphone array 114, microphones 218a and 218b, or a combination of the microphones) that are fixed to the UAV. In one embodiment, capturing the one or more audio signals 120 includes generating a time signal 222 defining one or more bounds of a time window. In one embodiment, capturing the one or more audio signals includes capturing a first desired audio signal 120 corresponding to the time window and a third undesired (e.g., noise-associated) audio signal 122 corresponding to the time window.

In one embodiment, the one or more cameras 116 and the one or more microphones 114 are aligned so that the field of vision of the one or more cameras 116 corresponds to the coverage area of the one or more microphones 114. In one embodiment, the microphones 114 aligned with the field of vision or corresponding to the visual coverage area are referred to as a first microphone.

In one embodiment, the one or more sensors 218 include a second and/or a third microphone (see FIG. 2B, sensing microphones 218a and 218b) proximal to two or more of the four rotors 102 and/or proximal to two or more of the four motors 106. In this regard, the second and/or third microphones 218a, 218b would work in tandem with a beaming structure of the first microphone (e.g., beaming microphone array 114) placed at the same viewing angle of the camera 116. In one embodiment, this configuration allows for noise reduction to occur at the point of noise capture (e.g., microphones 114 and 218a/b), applying one or more noise reduction strategies the remaining frequencies. In one embodiment, the second microphone 218a and 218b is configured and directed to capture the third audio signal (e.g., signal 122) corresponding to one or more of a rotor speed and a motor speed. In one embodiment, the third audio signal 122 includes one or more undesired frequencies that are measured/detected.

In one embodiment, the capturing of one or more audio signals includes capturing one or more noise-associated audio signals 122 from the one or more motors and/or the one or more rotors during the time window. In one embodiment, the capturing of audio signals 122 may be done during a calibration step, wherein the digital signal processor 230 is calibrated according to the audio signals 122 at one or more attitudes of the UAV.

In step 320, one or more frequencies are determined, wherein the determined frequencies correspond to one or more audio signals captured in step 310. In one embodiment, the determining of the one or more frequencies includes determining a speed of a motor 106, a speed of a rotor 102, a power input to a motor 106, or an attitude of the UAV. In one embodiment, the determining of the one or more frequencies includes determining each motor speed, each power input to each motor 106, or each rotor speed, and a corresponding attitude of the UAV.

In one embodiment, the speed of a rotor 102 and/or the speed of a motor 106 is determined by the one or more sensors 218. In one embodiment, the one or more sensors 218 are configured to determine an amount of power supplied to the one or more motors 106, wherein the amount of power supplied corresponds to one or more predetermined speeds of a motor 106 and/or a rotor 102. In one embodiment, the one or more sensors 218 are configured to determine an attitude of the UAV 100. In one embodiment, the one or more sensors 218 are configured to determine each of a rotor speed, a motor speed, and an attitude of the UAV. In one embodiment, the one or more sensors 218 are configured to determine each of a rotor speed, a motor speed, a power level supplied to one or more motors 106, and an attitude of the UAV 100.

In one embodiment, the determining of the one or more frequencies includes determining a frequency corresponding to the third audio signal (e.g., audio signal 122) captured in step 310. In one embodiment, the determining of the one or more frequencies includes digitizing one or more audio signals (e.g., audio signal 120 or signal 122), determining a frequency corresponding to each digitized signal, and associating that frequency with a motor 106, rotor 102, and/or a power level supplied to a motor 106. In one embodiment, the determining of the one or more frequencies includes determining a frequency of an audio signal 122 corresponding to an attitude of the UAV 100.

In one embodiment, the determining of the one or more frequencies includes determining a frequency corresponding to a digitized audio signal that includes a combination of two or more frequencies. In this regard, the two or more frequencies includes one frequency corresponding to a rotor 102, a motor 106, and an attitude of the UAV 100, or any combination thereof.

In one embodiment, determining one or more frequencies includes determining a frequency corresponding to one or more desired frequencies. For example, the human voice may prominently include frequencies in the range of 85 Hz to 255 Hz. In this regard, the sensors 218 may be further configured to detect one or more frequencies in the audio stream 120 captured by the beamforming microphone array 114 that fall within a predetermined desired range.

In step 330, one or more correction signals 236 are generated. In one embodiment, the one or more correction signals 236 are utilized to dynamically sum one or more frequencies determined in step 320. In one embodiment, generating a correction signal 236 includes generating a first sum of one or more frequencies that correspond to the first desired audio signal captured in the time window described in step 310. In one embodiment, generating a correction signal 236 includes generating a second sum of one or more frequencies 234a that correspond to the third (e.g., noise-associated) audio signal 122 captured in the time window in step 310. For example, the UAV may include a clock generator 222 configured to generate at least one time signal to define a bound of a first time window, a second time window, and an $n^{th}$ time window.

In one embodiment, generating one or more correction signals 236 includes generating an anti-noise, an anti-phase, and/or an anti-wave 236c. For example, using the first audio signal 122 captured in step 310 and the frequencies 234a of that signal determined in step 320, an anti-wave 236c may be generated by inverting one or more frequencies of the first audio signal 120. In this regard, the one or more correction signals 236 generated may include the anti-wave 236c.

In one embodiment, generating one or more correction signals includes dithering one or more frequencies 234b determined in step 320 into the audio signal 120.

In one embodiment, generating one or more correction signals 236 includes creating one or more enhancing correction signals to enhance one or more desired frequencies captured. For example, the signal processors 230 may enhance frequencies of the audio stream 120 determined in step 320 to be in a targeted range (e.g., the range corresponding to human speech). In this regard, one or more of an electrical resistance, a voltage, or a digital signal associated with the desired frequencies may be adjusted to enhance at least the volume output of the desired frequencies.

In step 340, the second audio signal 240 is generated. In one embodiment, one or more correction signals 236 are added together to generate the second audio signal 240. In one embodiment, adding one or more correction signals 236 includes adding the first sum of one or more desired frequencies to the second sum of one or more undesired frequencies 234a determined in step 320. In one embodiment, the adding of one or more correction signals 236 is done continuously, resulting in a dynamically summed second audio signal 240.

In one embodiment, the second audio signal 240 is generated by combining the one or more correction signals 236 including the anti-wave 236c to the first audio signal 120. In one embodiment, the second audio signal 240 is generated by combining the one or more correction signals 236 including the dithered correction signal to the first audio signal 120.

In one embodiment, the second audio signal 240 is generated by combining the one or more correction signals 236 with one or more enhancing signals. For example, the one or more correction signals 236 may be combined with a correction signal that enhances a frequency associated with the human voice.

In one embodiment, dependent on at least speed and angle, the operating noise 122 (and the associated frequencies) generated by each rotor 102 and motor 106 will vary on a constant basis. From this variation a dynamic sum of the varying frequencies corresponding to audio signal 122 can be generated, and the dynamic sum instantly blocked or subtracted from the streaming audio feed 120 by sensors 218 to create the second audio signal 240a. In this regard, there is no delay in processing and the live streaming capability of the UAV 100 is not hampered.

In one embodiment, the second audio signal 240 is generated by combining each of the corrected signals 240 including the anti-wave correction signal 236a, the dithered correction signal 236b, and the corrected signal 240a determined by subtracting out one or more determined frequencies. In one embodiment, a combination of only two of the different correction signals 236 is used to generate the second audio signal 240.

In one embodiment, the second audio signal 240 is wirelessly transmitted, such that the UAV may stream captured video images and the accompanying audio signal 240 in real time or near real time to nearby mobile devices. For example, the UAV 100 may stream video and audio 240 to one or more remote viewers 246. For instance, the one or more remote viewers 246 may be viewers interested in the real-time or near real-time video and audio streaming of a winter or summer sporting competition. In one embodiment, the wireless transmission is via a restricted access channel, which is only available to selected users.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

We claim:

1. A system for real-time noise reduction aboard an unmanned aerial vehicle (UAV) having at least one rotor and at least one motor coupled to the at least one rotor, the system comprising:
    at least one first microphone fixed to the UAV and configured to capture at least one first audio signal;
    at least one sensor fixed to the UAV and configured to determine at least one of a rotor speed of the at least one rotor, a motor speed of the at least one motor, and an attitude of the UAV;
    at least one digital signal processor fixed to the UAV and configured to:
        determine at least one first frequency corresponding to the at least one rotor, the at least one motor, and the attitude of the UAV;
        generate at least one correction signal corresponding to a dynamic sum of the at least one first frequency; and
        generate at least one second audio signal by combining the at least one correction signal and the first audio signal.

2. The system of claim 1, wherein the at least one sensor fixed to the UAV includes a second microphone proximal to at least one of the at least one rotor and the at least one motor, the second microphone configured to capture a third audio signal corresponding to at least one of the at least one rotor and the at least one motor, the third audio signal including at least one first frequency.

3. The system of claim 1, wherein the at least one first microphone includes a beamforming array of at least one microphone.

4. The system of claim 1, wherein the at least one digital signal processor is further configured to generate a digital representation of at least one of the first audio signal or the third audio signal.

5. The system of claim 1, further comprising:
at least one clock generator configured to generate at least one time signal defining a bound of a first time window.

6. An unmanned aerial vehicle (UAV) configured to capture a streaming audio feed, comprising:
an airframe;
at least one rotor fixed to the airframe, configured to rotate at a rotor speed selected from a plurality of rotor speeds;
at least one motor coupled to the at least one rotor, configured to drive the at least one rotor and to operate at a motor speed selected from a plurality of motor speeds;
at least one first microphone fixed to the airframe and configured to capture at least one first audio signal;
at least one sensor fixed to the airframe and configured to determine at least one of a rotor speed, a motor speed, and an attitude of the UAV;
at least one digital signal processor coupled to the at least one first microphone and to the at least one sensor, the at least one digital signal processor configured to:
generate a digital representation of the at least one first audio signal;
determine at least one first frequency corresponding to at least one of the rotor speed, the motor speed, and the attitude of the UAV;
generate at least one correction signal corresponding to a dynamic sum of the at least one first frequency; and
generate at least one second audio signal by combining the at least one first audio signal and the at least one correction signal.

7. The unmanned aerial vehicle of claim 6, further comprising:
at least one data storage unit configured to store the at least one second audio signal; and
at least one transmitter configured to transmit the at least one second audio signal via wireless link.

8. The unmanned aerial vehicle of claim 6, further comprising:
at least one camera fixed to the airframe and configured to capture at least one first image corresponding to the at least one first audio signal.

9. The unmanned aerial vehicle of claim 8, wherein the at least one camera and the at least one first microphone are aligned so that the field of vision of the at least one camera corresponds to the coverage area of the at least one first microphone.

10. The unmanned aerial vehicle of claim 6, wherein the at least one first microphone includes a beamforming microphone array.

11. The unmanned aerial vehicle of claim 6, wherein the at least one sensor includes a second microphone proximal to at least one of the at least one rotor and the at least one motor, the second microphone configured to capture a third audio signal corresponding to at least one of a rotor speed and a motor speed, the third audio signal including at least one first frequency.

12. A method for real-time noise reduction aboard an unmanned aerial vehicle (UAV) having (1) at least one rotor and (2) at least one motor coupled to the at least one rotor, the method comprising:
capturing at least one first audio signal via at least one first microphone fixed to the UAV;
determining at least one first frequency corresponding to at least one of the at least one rotor, the at least one motor, and an attitude of the UAV;
generating at least one correction signal corresponding to a dynamic sum of the at least one first frequency;
generating at least one second audio signal by combining the at least one correction signal and the first audio signal.

13. The method of claim 12, wherein determining at least one first frequency corresponding to at least one of the at least one rotor, the at least one motor, and an attitude of the UAV includes
determining at least one of a rotor speed of the at least one rotor, a motor speed of the at least one rotor, and an attitude of the UAV; and
determining at least one first frequency corresponding to at least one of the rotor speed, the motor speed, and the attitude of the UAV.

14. The method of claim 13, wherein determining at least one of a rotor speed of the at least one rotor, a motor speed of the at least one rotor, and an attitude of the UAV includes
determining at least one of a rotor speed of the at least one rotor, a motor speed of the at least one rotor, and an attitude of the UAV via at least one sensor fixed to the UAV.

15. The method of claim 12, wherein determining at least one first frequency corresponding to at least one of the at least one rotor, the at least one motor, and an attitude of the UAV includes
determining at least one first frequency via at least one sensor coupled to at least one of the at least one rotor and the at least one motor.

16. The method of claim 12, wherein capturing at least one first audio signal via at least one first microphone fixed to the UAV includes
generating at least one time signal, the at least one time signal defining a bound of at least one first time window; and
capturing at least one first audio signal corresponding to the first time window.

17. The method of claim 16, wherein generating at least one correction signal corresponding to a dynamic sum of the at least one first frequency includes
generating at least one first sum of the at least one first frequency corresponding to the at least one first time window; and
generating at least one correction signal corresponding to the at least one first sum of the at least one first frequency.

18. The method of claim 17, wherein generating at least one second audio signal by combining the at least one correction signal and the first audio signal includes generating at least one second audio signal corresponding to the at least one first time window by combining the at least one correction signal and the first audio signal corresponding to the at least one first time window.

19. The method of claim 12, wherein:
capturing a first audio signal including at least one first frequency via at least one first microphone fixed to the UAV includes capturing a first audio signal having at least one first frequency and at least one second frequency via at least one first microphone fixed to the UAV; and
generating at least one correction signal corresponding to the dynamic sum of the at least one first frequency includes generating at least one correction signal by subtracting from the first audio signal the at least one first frequency.

20. The method of claim 19, further comprising:
determining whether at least the second frequency corresponds to one or more predetermined frequencies, wherein the predetermined frequencies correspond to one or more desired frequencies, the one or more desired frequencies including at least one or more frequencies associated with human speech;
enhancing the second frequency by adjusting at least one of an electrical resistance, a voltage, or a digital signal associated with the second frequency.

21. The method of claim 12, wherein:
capturing a first audio signal including at least one first frequency via at least one first microphone fixed to the UAV includes capturing a first audio signal having a first amplitude and including at least one first frequency via at least one first microphone fixed to the UAV; and
generating at least one correction signal corresponding to the dynamic sum of the at least one first frequency includes generating at least one correction signal antiphase to the at least one first audio signal and having at least the first amplitude.

22. The method of claim 12, wherein capturing at least one first audio signal including at least one first frequency via at least one first microphone fixed to the UAV includes generating a first digital representation of the at least one first audio signal.

* * * * *